C. W. THOMPSON

Nov. 6, 1928.

SHOCK ABSORBER

Re. 17,127

3 Sheets-Sheet 1

Original Filed April 14, 1924

Inventor

Clarance W. Thompson,

By H. Ralph Burton,

Attorney

Nov. 6, 1928. C. W. THOMPSON Re. 17,127

SHOCK ABSORBER

3 Sheets-Sheet 2

Original Filed April 14, 1924

Inventor

Clarance W. Thompson,

By H. Ralph Burton,

Attorney

Nov. 6, 1928. C. W. THOMPSON Re. 17,127

SHOCK ABSORBER

3 Sheets-Sheet 3

Original Filed April 14, 1924

Inventor

Clarance W. Thompson,

By H. Ralph Burton,

Attorney

Reissued Nov. 6, 1928. Re. 17,127

UNITED STATES PATENT OFFICE.

CLARANCE W. THOMPSON, OF WILMINGTON, DELAWARE, ASSIGNOR, BY MESNE ASSIGNMENTS, TO SUPERIOR EQUIPMENT CORPORATION, A CORPORATION OF DELAWARE.

SHOCK ABSORBER.

Original No. 1,592,912, dated July 20, 1926, Serial No. 706,472, filed April 14, 1924. Application for reissue filed July 19, 1928. Serial No. 293,965.

The device provided by the invention is formed and arranged so that it offers resistance to spring compression between the load and running-gear of a vehicle, and restrains with greater resistance the upward rebound of the load after spring compression. The device is intended primarily for association with motor-vehicles, but it also is adaptable to other uses.

More specifically, the invention pertains to devices of the type that comprise a piston acting in a casing against fluid therein.

It is an object of the invention, not only so to form and arrange the parts that more resistance is offered to piston movement in one direction than in the other, but also to offer more resistance to piston movement near the ends of the casing than when the piston is in intermediate position whereby sudden stoppage of relative movement of the casing and piston and of the parts connected therewith is prevented.

Further, it is an object of the invention to associate with piston-ports a valve member so arranged that it will leave the ports open on movement of the piston in one direction and instantly restrict fluid flow therethrough on commencement of movement in the opposite direction.

It also is a purpose of the invention to improve details of construction and arrangement of parts in devices of this sort.

When considered in connection with the description herein, the characteristics of the invention are apparent from the accompanying drawings, forming part hereof, wherein embodiments of the invention adapted for use in motor-vehicles are disclosed, for purposes of illustration.

Although the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which:—

Figure 1:
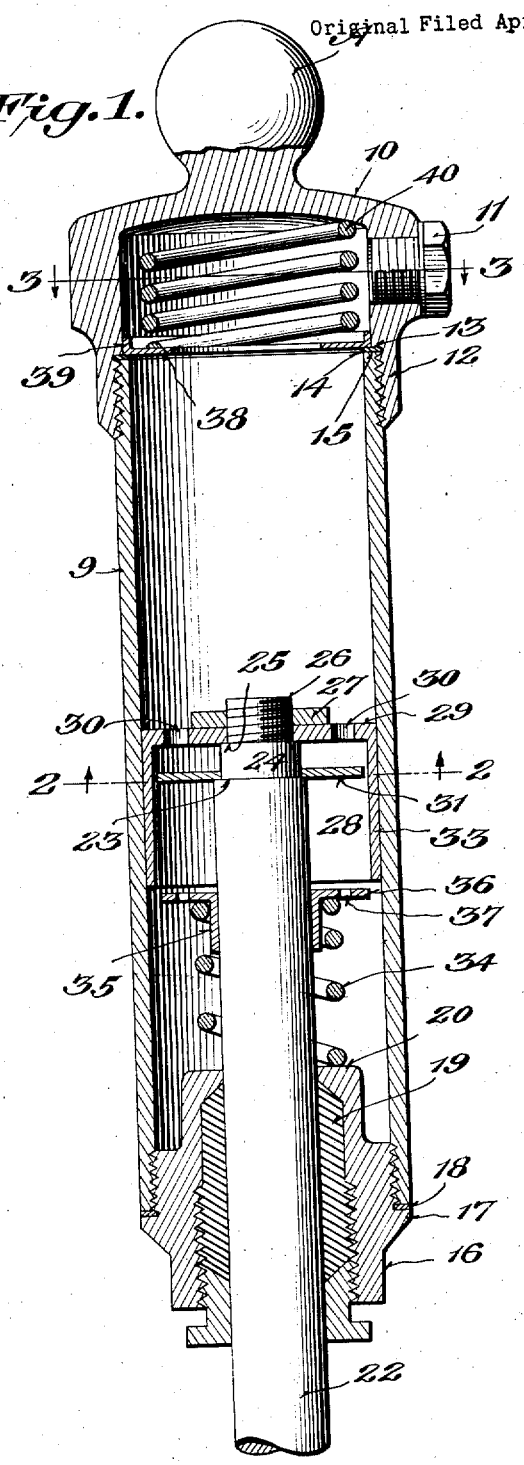
Fig. 1 is a longitudinal section.

The device includes an elongated casing 9, which preferably is of cylindrical form. When of the type disclosed by Fig. 1, the casings may be produced by severing required lengths from tubular stock and by screw threading the pieces exteriorly at one end and interiorly at the other.

The casing is closed at one end by a cap 10 provided with a port, closed by a plug 11, through which the device may be charged and drained of liquid. The cap includes a sleeve 12 screwed onto the exteriorly-threaded end of the casing. The sleeve has an interior annular abutment or shoulder 13, which bears against the end of the casing when turned down thereagainst, and a gasket 14 may be interposed between the abutment and casing end to afford a fluid-tight joint. The cap contains a chamber located beyond the end of the casing. The interior diameter of the cap-sleeve is slightly greater than that of the casing, so that the casing end affords an interior annular abutment or seat 15 at the end of the sleeve-chamber for a purpose hereinafter explained.

The casing of the form exemplified by Fig. 1 is closed at its other end by a plug 16 screwed thereinto and having an exterior abutment or shoulder 17 bearing against a gasket 18 between it and the casing end to provide a fluid-tight joint. The plug contains a stuffing box 19, which extends inwardly of the casing beyond the body of the plug and terminates in a centrally positioned annular abutment or wall 20.

Figure 5:
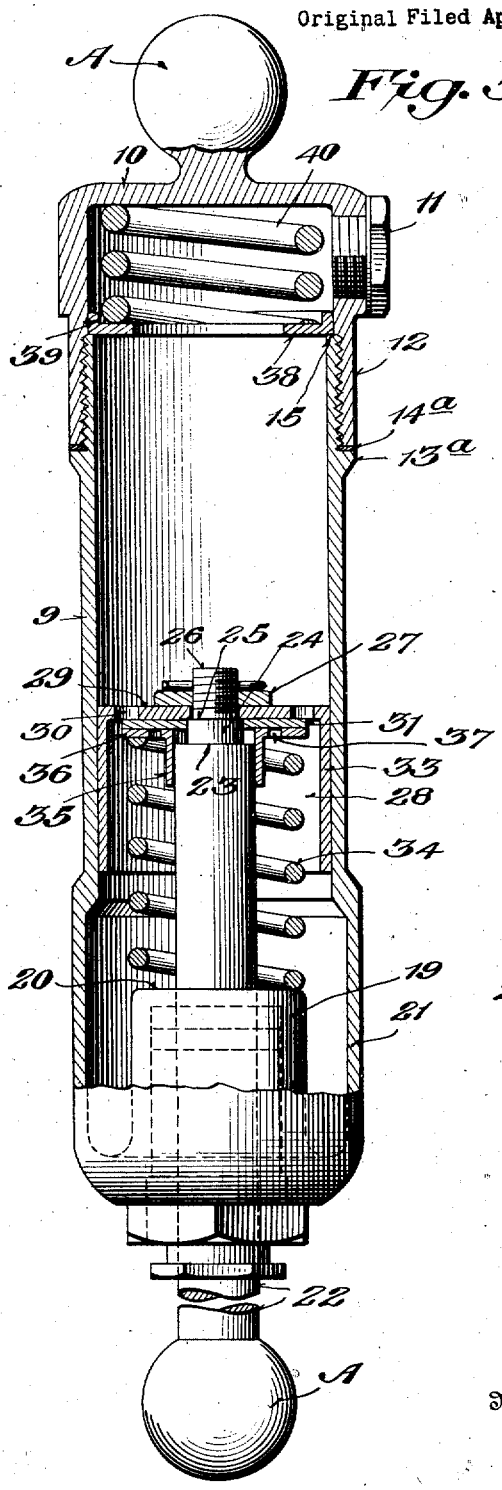
Fig. 5 is a longitudinal section illustrative of an alternative form of casing.

The casing also may be a hollow casting of a form exemplified by Fig. 5. In that form it has near its exteriorly-threaded end an annular abutment or shoulder $13^a$, on which is a gasket $14^a$, against which the end of the cap-sleeve 12 is turned to provide a fluid-tight joint. The other end portion of the casing is enlarged, as shown at 21, and a stuffing box of substantially the same form as that disclosed by Fig. 1 is formed integrally with the casing wall.

A piston-rod 22 is reciprocable in the stuffing-box and extends into the casing. It has on its inner end portion an annular shoulder or seat 23, a part 24 of less diameter extending therefrom, an annular shoulder or seat 25 on that part, and a threaded terminal 26 of less diameter extending therefrom and carrying a nut 27.

A hollow piston or stress-sustaining member 28 is reciprocable in the casing and has close fit with the side wall thereof. The piston includes an upper disk-like wall or head 29 having a central opening of substantially the size of the threaded piston-rod terminal 26 and through which that terminal extends. The nut 27 holds the piston on the rod and the piston-head against the shoulder 25. Equally-spaced ports 30 extend through the head in circular disposition.

A floating valve member 31, substantially of washer-like flat form, is movable freely on the reduced part 24 of the piston-rod between the shoulder 23 and the piston-head, which parts limit its sliding movement. It is formed to seat closely against the head and in that position to close the major area of the ports 30 and thus restrict or reduce the area of the ports available for fluid flow therethrough. The member 31 may be formed in any one of several ways to leave open part of the area of the ports 30 when it is against the head.

Figure 2:
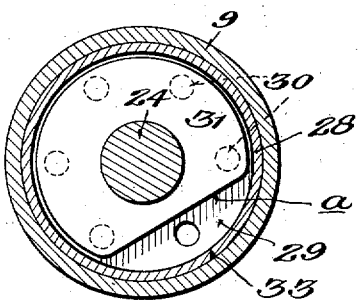
Fig. 2 is a section on the line 2—2, Fig. 1.

For example, the member 31, as shown by Fig. 2, has a segment omitted or cut therefrom along line *a*, which is so coordinated with respect to the circularly-disposed ports 30 that, when it is tangent to the inner side of one of them, it is about tangent to the outer side of an adjacent port. Thus the area of one port is uncovered by the valve member, and it is unnecessary to prevent rotary movement of that member; for, if the member turns and begins to cover one port, it at the same time will uncover an approximately equal area of another port. In view of the fact that it is unnecessary to spline the member 31 on the piston-rod or otherwise prevent its rotation, it is freely movable on the rod and is not apt to become caught either in or out of port-closing position. It is to be understood, of course, that, if desired, the valve member may be formed so that it will leave more than one port or the area of less than one port uncovered, the amount of uncovered area being dependent upon the size of the segment omitted or cut from the member.

Figure 4:
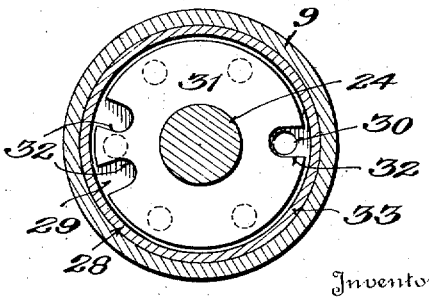
Fig. 4 is a section illustrative of an alternative form of valve member.

The valve member also may be formed with ports 32 so relatively disposed with respect to the spacing of the head-ports 30 that one of them comes into alinement with one of the latter ports as another moves therefrom, as shown by Fig. 4.

Figure 6:
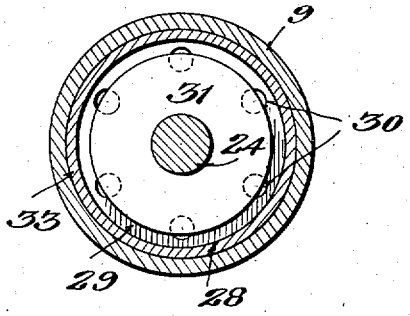
Fig. 6 is a section illustrative of another form of valve member.

In still another form, as exemplified by Fig. 6, the valve member 31 is of such diameter that its periphery intersects the peripheries of the ports 30, and thus leaves a part of all of those ports uncovered and open.

The piston also includes a side wall or skirt 33 integrally formed with and extending from the head 29 toward the stuffing-box end of the casing. That wall closely fits the casing-wall, and it comprehends a chamber open at one end and having the ports 30 communicating therewith. The diameter of the valve member 31 is somewhat less than the interior diameter of the wall 33, so that an annular passage is afforded between the periphery of that member and the wall from one side of the member to the other.

A compression-resistive coil-spring 34 rests on an end wall or abutment of the casing, as on the end wall or abutment 20 of the stuffing-box. A member comprising a collar 35 and a head 36 of disk form is slidable on the piston-rod 22. It bears at one side against the spring 34, and its head is arranged to move into the piston-chamber and to have close fit with the wall 33. The head is formed with ports 37, for a purpose hereinafter explained.

Figure 3:
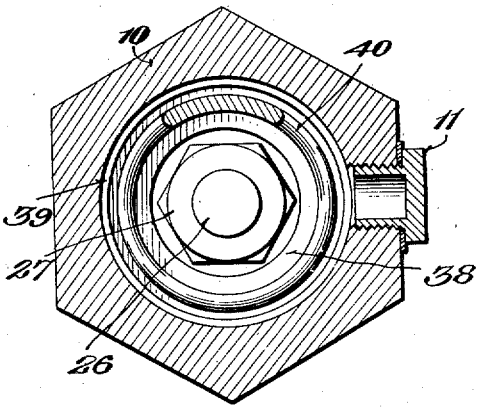
Fig. 3 is a section on the line 3—3, Fig. 1.
Figure 7:
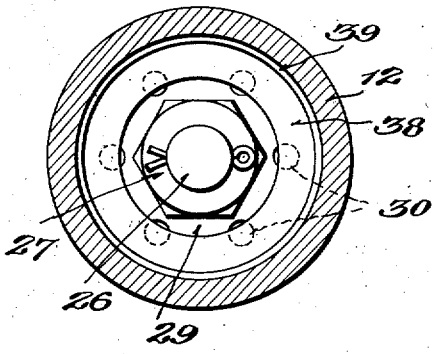
Fig. 7 is a section illustrative of another form of stop member.

A stop member 38 of flat-ring form and having an annular flange 39 at its outer periphery is slidable in the chamber of the cap in fairly close contact with the wall of the sleeve 12, the flange being provided to restrain the member from tilting. The member 38 yieldably is held on the seat 15 by a compression-resistive coil-spring 40 interposed between it and the head of the cap. The stop member, when of the form disclosed by Figs. 1 and 3, is arranged to cover and close all of the ports 30 when the head of the piston comes into contact therewith. The stop member also may be correlated with respect to those ports in such manner that part of the port area is left open when it and the piston-head come together; as, for example, by making the interior periphery of the member of such diameter that it intersects the peripheries of the ports 30 and thus leaves part of the area of the ports open, as shown by Fig. 7.

The casing is charged with any suitable fluid, such, for example, as oil or alcohol, the viscosity and other characteristics of the liquid employed being determined by the conditions to be encountered in service and the sensitiveness it is desired to have in the device, it being understood, of course, that more resistance to piston movement is offered with heavy fluid than with light.

Figure 8:
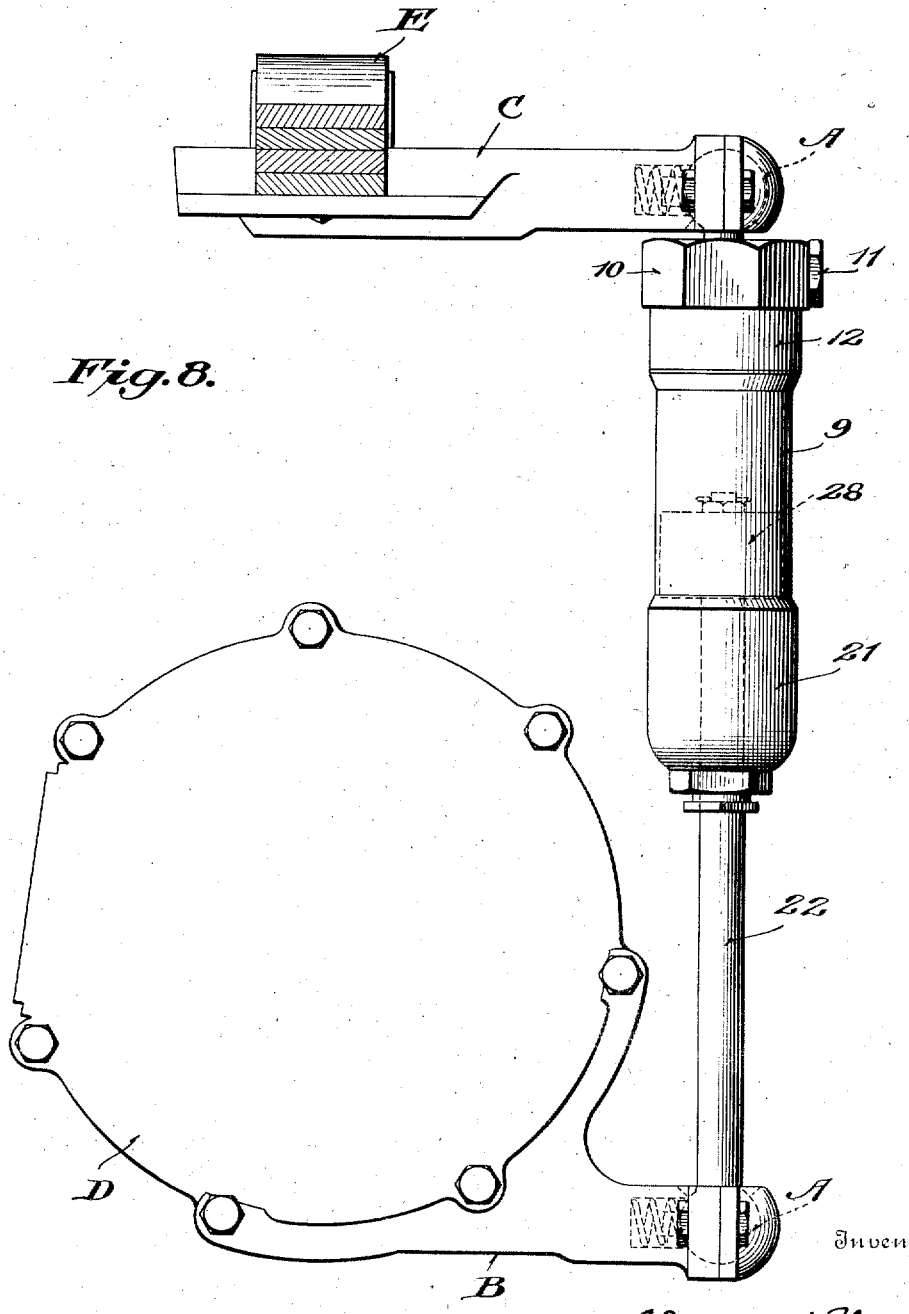
Fig. 8 is a view of an installation of the device.

The device may have its casing and piston-rod connected in any suitable manner with two relatively movable parts, as with the running-gear and with the crown of a vehicle-spring supported thereon. For example, as shown by Fig. 8, the casing-cap and piston-rod may be formed with balls A, which are associated with sockets of members B and C connected, respectively, with an axle structure D and a body member E. Such an installation is disclosed merely for exemplification, as the device will function satisfactorily when in a substantially vertical position the reverse of that shown and when installed in horizontal or inclined positions.

The several parts preferably are coordinated in such manner that, with the usual conditions of load and roadway, the piston-head is at, or about at, a position approximately midway between the ends of the casing, as shown by Fig. 1, where it is out of cooperation with the head 36.

When a vehicle equipped with one or more of these devices is in motion and the running-gear and a load spring supported thereon are thrust toward each other as a result of irregularities in the roadway or other causes incident to operation, the piston and cap of each device move toward each other. During such movement, fluid in the casing passes freely through all of the ports 30 from the outside to the inside of the piston, pressure of fluid keeps the valve member 31 in open position on the shoulder 23, fluid flows between the periphery of that member and the piston-wall 33, and the piston only encounters such resistance to movement in that direction as results from friction and the forcing of the fluid from one side of the piston to the other.

If the thrust force is of such extraordinary amount as to be sufficient to bring the piston-head and the stop member 38 into contact, that member entirely or partly closes the piston-ports, dependent upon whether it is of the form of Figs. 1 and 3 or that of Fig. 7, and greater resistance is offered to further movement by the cushioning action of fluid and the spring 40 in the cap-chamber, and that movement stopped. Even with the maximum thrust that may be liable to be imposed on the device, piston movement is stopped by the spring 40 when it closes and thus reaches the limit of its compression, if it is not stopped before by hydrostatic or gas action.

On cessation of thrust of load and running-gear toward each other and commencement of rebound or movement in the opposite direction under the influence of springs supporting the load on the running-gear, the piston and cap move away from each other and fluid in the casing tends to flow in the opposite direction through the piston-ports. The fluid instantly moves the valve member against the piston-head and closes the ports thereof to the extent it is arranged to close them. Accordingly, more resistance is afforded to movement in that direction than in the thrust direction, and rebound action in the vehicle is snubbed. Even after slight thrust action with comparatively slight movement of the piston, on commencement of a corresponding rebound action the valve member at once comes into closing relation to the ports and reaction is restrained.

If the rebound force is sufficient to bring the head 36 into the piston, increased resistance to piston movement results from contact of that head with the piston-wall 33 and from fluid pressure until the head and valve member 31 comes into contact. Fluid by flowing through the ports 37 in the head 36 is cleared quickly from between the head and the valve member and those parts are permitted to come close together, with the valve member entirely closing the ports 37. Then the piston-ports 30 are entirely closed by the head and appreciable further rebound movement checked by the cushioning action of fluid and of the spring 34, the amount of such movement when the device is charged with liquid being only that that may be permitted by slight leakage around port-closing parts. Even with the most forceful rebound action that may be liable to be imposed on the device, piston movement is stopped by the spring 34 when it becomes closed and thus reaches the limit of its compression, if it is not stopped before by hydrostatic or gas action.

After cessation of rebound action, and when the load begins to settle down toward normal position against its spring supports on the running-gear, the piston and cap move toward each other as they do in response to thrust action, and under the influence of fluid action the valve member moves from contact with the piston-head to or toward the shoulder 23, and all of the ports 30 are opened. In view of the tendency of the fluid during movement of the valve member toward the shoulder 23 to seek the ports 37 of the head 36, that head is separated thereby from the valve member before the valve member reaches the seat, and during further movement of the piston that head is forced by fluid out of the piston as the latter approaches normal position.

A device constructed in accordance with any of the exemplifications herein disclosed functions efficiently to resist relative movement of two parts in one direction, to afford greater resistance to movement of the parts in the opposite direction, and to afford greater resistance near the limits of movement in either direction than when the piston is in intermediate position whereby sudden stoppage of movement is avoided. Moreover, the arrangement of valve member and associated parts provided by the invention is such that there is instant restriction of flow of fluid and increased resistance to movement when the piston starts motion in one direction (as in the rebound) and later there is practically entire closure of fluid passages whereby further motion in that direction is stopped. In view of the instant movement of the valve member to port-restricting position, rebound action is restrained even after slight thrust action.

Having thus described my invention, what I claim as new, and desire to secure by Letters Patent, is—

1. A shock-absorber comprising a casing, a rod reciprocable therein having a shoulder, a hollow piston including a side wall and a head having ports connected to said rod, a valve member in said piston freely movable on said rod between said shoulder and head arranged to contact with the latter and restrict flow of fluid through said ports, there being a passage from one side of said valve member to the other, and a member slidable on said rod in contact with said piston-wall into and out of contact with said valve member.

2. A shock-absorber comprising a casing, a rod reciprocable therein having a shoulder, a hollow piston including a side wall and a head having ports connected to said rod, a valve member in said piston freely movable on said rod between said shoulder and head arranged to contact with the latter and restrict flow of fluid through said ports, there being a passage from one side of said valve member to the other, and a member, having a port, slidable on said rod in contact with said piston-wall into and out of contact with said valve member.

3. A shock-absorber comprising a casing, a rod reciprocable therein having a shoulder, a hollow piston including a side wall and a head having ports connected to said rod, a valve member in said piston freely movable on said rod between said shouder and head arranged to contact with the latter and to cover some of the area of said ports, there being a passage from one side of said valve member to the other, a member slidable on said rod in contact with said piston-wall into and out of contact with said valve member, and a spring against which said latter member bears on its side opposite to said piston-head.

4. In a shock-absorber, the combination of a casing having a seat therein, a rod reciprocable in said casing having a shoulder, a hollow piston including a side wall and a head having ports connected to said rod, a valve member in said piston freely movable on said rod between said shoulder and head arranged to contact with the latter and restrict flow of fluid through said ports, there being a passage from one side of said valve member to the other, a member slidable on said rod in contact with said piston-wall into and out of contact with said valve member, a spring against which said latter member bears on its side opposite to said piston-head, a movable stop member normally resting on said seat in the path of movement of said piston-head arranged to contact therewith on the side opposite to said valve member and restrict flow of fluid through said ports, and a spring yieldably pressing said stop member against said seat and arranged to resist movement of said piston.

5. A shock-absorber, comprising a cylinder adapted to be substantialy filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, and means disposed at one end of said cylinder adapted toward the limit of possible relative movement between the piston and cylinder in the first-mentioned direction to co-act with said piston to substantially entrap a body of liquid between the piston and cylinder end, said means being formed to permit a restricted escape of such entrapped liquid.

6. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, and means disposed at one end of the cylinder and arranged toward the limit of possible relative movement between the piston and cylinder in the first-mentioned direction to co-act with said piston to materially restrict the flow through said ports of liquid otherwise entrapped between the piston and cylinder end.

7. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid trough said ports and during relative movement between said piston and cylinder in the opposite direction to materially restrict passage of fluid past said piston, and a disc member disposed at one end of said cylinder in such a position as to engage with said piston toward the limit of possible relative movement of the piston and cylinder in the first mentioned direction, said member being formed to cut off the greater part of the port area of the piston, to substantially entrap liquid between the piston and cylinder end and to leave open a sufficient part of such port area to permit restricted escape of such entrapped liquid.

8. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, and an annular member disposed at one end of said cylinder and arranged toward the limit of possible relative movement between the piston and cylinder in the first-mentioned direction to co-act with the piston to cut off a material part of the port area to restrict passage of liquid through the piston and provide a strong liquid resistance to further movement of the piston.

9. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, and means disposed at one end of said cylinder adapted toward the limit of possible relative movement between the piston and cylinder in the first-mentioned direction to co-act with said piston to substantially entrap a body of liquid between the piston and cylinder end, said means being formed to permit a restricted escape of such entrapped liquid, and being yieldable in the first mentioned direction of movement of the piston.

10. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, and an annular member spring held in a predetermined position at one end of said cylinder and arranged toward the limit of possible relative movement between the piston and cylinder in the first mentioned direction to co-act with the piston to cut off a material part of the port area to restrict passage of liquid through the piston and provide a strong liquid resistance to further movement of said piston.

11. A shock-absorber, comprising a cylinder adapted to be substantially filled with liquid, a rod reciprocable within said cylinder, a piston mounted upon said rod and fitting within said cylinder and having ports therethrough, valve means associated with said piston and effective during relative movement between said piston and cylinder in one direction to permit passage of liquid through said ports and during relative movement between said piston and cylinder in the opposite direction to materially restrict passage of fluid past said piston, said cylinder being formed with a seat adjacent one end thereof, a member engaging said seat, and a spring between said member and the cylinder end, said member being thereby positioned to engage said piston toward the limit of possible relative movement between the piston and cylinder in the first mentioned direction, and being formed so as to materially restrict the flow through said ports of liquid otherwise entrapped between the piston and cylinder end.

In testimony whereof I affix my signature.

CLARANCE W. THOMPSON.